United States Patent
Kitamura et al.

(10) Patent No.: US 6,868,259 B1
(45) Date of Patent: Mar. 15, 2005

(54) KEYBUTTON ILLUMINATING DEVICE AND WIRELESS COMMUNICATION TERMINAL APPARATUS EQUIPPED WITH THE SAME

(75) Inventors: Toshiyasu Kitamura, Kanagawa (JP); Kazuhiro Konishi, Shizuoka (JP); Taichi Tabata, Kanagawa (JP); Kouichi Yamamoto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 445 days.

(21) Appl. No.: 09/696,358

(22) Filed: Oct. 25, 2000

(30) Foreign Application Priority Data

Oct. 26, 1999 (JP) ............................................. 11-304597

(51) Int. Cl.[7] ............................ H04B 1/38; H04B 1/08; H04M 1/00; N01H 21/04
(52) U.S. Cl. ................ 455/90.3; 455/550.1; 455/575.1; 455/347; 200/314; 200/317; 200/305
(58) Field of Search .............................. 455/90.3, 550.1, 455/575.1, 347, 348; 200/314, 317, 305

(56) References Cited

U.S. PATENT DOCUMENTS

| 4,776,120 A | | 10/1988 | Utoh et al. |
| 5,664,667 A | * | 9/1997 | Kenmochi ................... 200/314 |
| 5,740,543 A | * | 4/1998 | Maeda ........................ 455/550 |
| 6,100,478 A | * | 8/2000 | LaPointe et al. ............ 200/314 |

FOREIGN PATENT DOCUMENTS

EP          1 094 652        4/2001

* cited by examiner

*Primary Examiner*—Lee Nguyen
*Assistant Examiner*—Yuwen Pan
(74) *Attorney, Agent, or Firm*—Pearne & Gordon LLP

(57) ABSTRACT

A keybutton structure that is composed of the casing 18, the shielding case 10 that is provided with metal-type surface treatment, the keybutton 7 and the printed circuit board 8 that is mounted with a light emitting element, in that the light emitting element 22, such as the LED, is surrounded entirely by the rib 21 that is disposed upright on the shielding case 10. This configuration enables solving of the space problem as well as improvement in the luminous efficiency.

9 Claims, 4 Drawing Sheets

KEYBUTTON ILLUMINATING DEVICE AND WIRELESS COMMUNICATION TERMINAL APPARATUS EQUIPPED WITH THE SAME

BACKGROUND OF THE INVENTION

The present invention relates to a keybutton illuminating device for a wireless communication terminal apparatus, such as a portable cellular telephone apparatus, which comprises high-frequency electronic parts and a shielding case and to a wireless communication terminal apparatus that is equipped with a keybutton illuminating device, and which has a specific configuration that can improve the luminous efficiency through reflecting the light beams emitted from the light emitting element against the shielding case wall.

Many of conventional wireless communication terminal equipments, such as a portable cellular telephone apparatus, illuminates ten-key part with light of light emitting elements during operations and at incoming call. As for conventional keybutton illumination methods, the adopted methods are either a use of special parts for concentration of light from the light emitting element that is mounted on the printed circuit board or reflection and propagation of the light beams with a reflective sheet.

However, elimination of extra space inside an apparatus along with progress in down-sizing and weight reduction of the apparatus main body, the use of the special parts and the reflective sheet has become difficult against the design policy of parts count reduction for advancement of weight reduction.

Although there has been no case of illuminable keybutton disposed at a part covered with a shielding case since it is explicit that light cannot come out of the shielding case even a light emitting element may be provided on the printed circuit board, there has been a new recent demand for use of the illuminable keybuttons disposed at the part covered with the shielding case for increase of functions.

SUMMARY OF THE INVENTION

This invention is primarily purposed to provide a keybutton illuminating device that can increase the luminous efficiency through forming of a hole part at a certain part in the shielding case, disposing of a keybutton in such a hole part and reflecting the light beams emitted from a light emitting element that is disposed under the key button against the shielding case wall, as well as to solve the space problem along with progress in reduction of the size and weight of the above described apparatus main body and is secondarily purposed to provide a wireless communication terminal apparatus that enables a prescribed display through mounting of the above-described keybutton illuminating apparatus.

According to the first aspect of the invention, a keybutton illuminating device for a keybutton structure comprises a casing, a shielding case that is provided with metal-type surface treatment, a keybutton and a printed circuit board that is mounted with a light emitting element, in that the light emitting element is surrounded entirely by a rib that is disposed upright on the shielding case. This configuration enables solving of the space problem as well as improvement in the luminous efficiency.

According to the second aspect of the invention, a keybutton illuminating device for a keybutton structure comprises a casing, a shielding case that is provided with metal-type surface treatment, a keybutton and a printed circuit board that is mounted with a light emitting element, in that the light emitting element is surrounded entirely by a rib that is provided upright on the shielding case in such manner that a surface that contacts the printed circuit board contacts in a full and tight adherence. This configuration enables solving of the space problem as well as further improvement in the luminous efficiency.

Preferably, a rib that is provided upright on the shield is so constructed as to surround the light emitting element in an approximately oval shape. This configuration enables an improvement in the luminous efficiency.

According to third aspect of the invention, a keybutton illuminating device, wherein a keybutton for switch actions of contact patterns that are print-wired on both sides of a light emitting element that is mounted on a printed circuit board is operated by pressing of a contact member that is disposed on this keybutton, in that a shielding case for holding of a skirt part of the keybutton is disposed upright on the printed circuit board in such manner as to surround the light emitting element and the contact patterns and by that wall of the shielding case reflects light beams that are emitted from the light emitting element. This configuration enables solving of the space problem and improvement in the luminous efficiency.

Preferably, a wall that reflects light beams from a light emitting element of the shielding case is plated for a mirror finish. This configuration enables an improvement in the luminous efficiency.

According to the fourth aspect of the invention, a wireless communication terminal apparatus that is equipped with a keybutton illuminating device for a keybutton structure that is composed of a casing, a shielding case that is provided with metal-type surface treatment, a keybutton and a printed circuit board that is mounted with a light emitting element, in that the light emitting element is surrounded entirely by a rib that is disposed upright on the shielding case. This configuration enables solving of the space problem and providing of the wireless communication terminal apparatus that is equipped with the keybutton illuminating device of a further improved luminous efficiency.

Preferably, the keybutton may be operated when there is a need for a voice memo operation for recording of the contents of a present vocal communication, wherein the light emitting element comes to illuminate or blink on start of the voice memo operation. This configuration enables notification of the start of the voice memo operation with illumination or blink of the light emitting element.

Furthermore, the keybutton may remain illuminating or blinking during communication. This configuration enables notification of the active state of communication with the illumination or blink of the light emitting element.

Still further, the keybutton remains illuminating or blinking during communication but, on start of voice memo operation for recording of the present vocal communication by depression thereof, starts illuminating or blinking in a manner different from the illuminating or blinking manner during the communication. This configuration enables notification of the two active states of communication and voice memo recording respectively with a single keybutton.

DETAILED DESCRIPTION OF THE PREFERRED EMBODIMENTS

As for the embodiments of the invention, the entire configuration of the wireless communication terminal equipment where the keybutton illuminating device of the invention is mounted is described hereafter with references to FIGS. 1 through 3 and the configuration of the keybutton illuminating device of the invention is described in detail with references to FIG. 4 as follows.

Figure 1A:
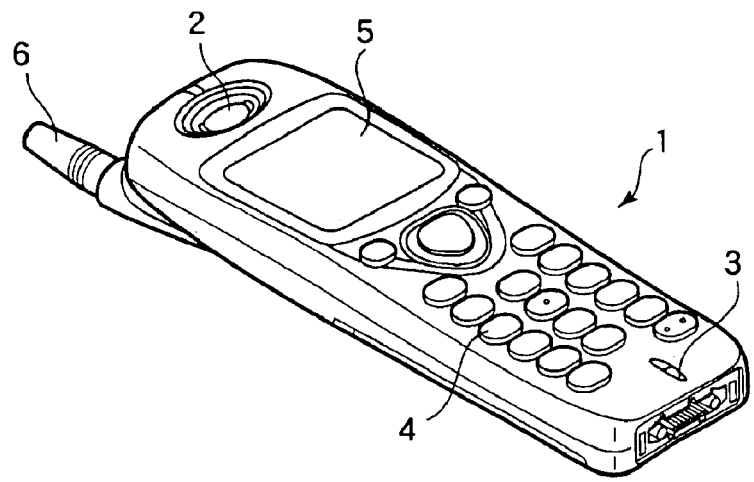
FIG. 1A is an external perspective view of a portable cellular telephone apparatus that is related to an embodiment of the invention.

FIG. 1A is an external perspective view of a portable cellular telephone apparatus as a wireless communication terminal apparatus that is related to an embodiment of the invention, with an operation side up, wherein a telephone receiver part 2, a telephone transmitter part 3, a key operation part 4, a display part 5 and an antenna part 6 are disposed on a main body case 1.

Figure 1B:
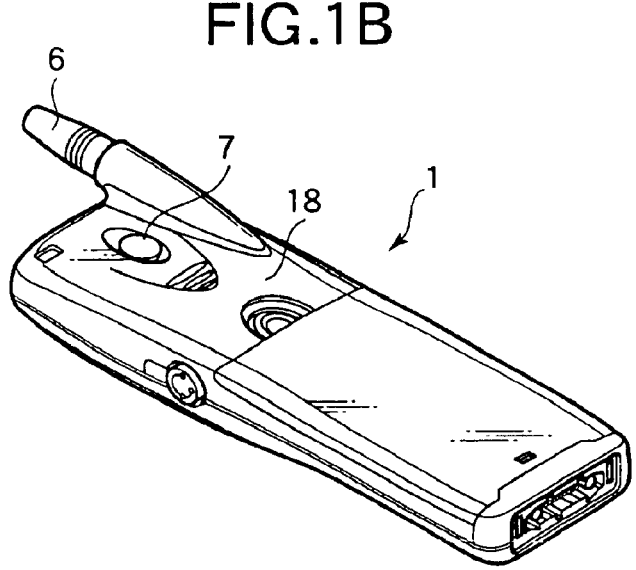
FIG. 1B is an external perspective view of the portable cellular telephone apparatus that is related to the embodiment of the invention.

FIG. 1B is an external perspective view of the wireless communication terminal apparatus that is related to the embodiment of the invention, with the back side up, wherein a voice memo recording keybutton 7 for start of recording the contents of present vocal communication by depression thereof is disposed in the vicinity of the antenna part 6 of the main body case 1.

Figure 1C:
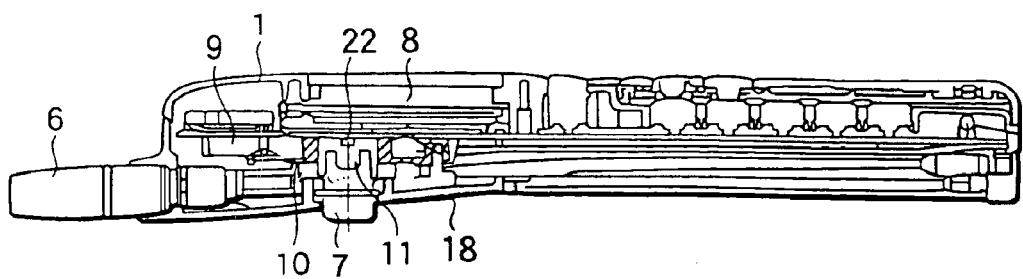
FIG. 1C is a sectional view of the portable cellular telephone apparatus related to the embodiment of the invention.

FIG. 1C is a sectional view of the wireless communication terminal apparatus related to the embodiment of the invention, wherein a printed circuit board 8 is provided inside the main body case 1 and wherein a wireless communication circuit part 9 for wireless communication is disposed on the printed circuit board 8 in the vicinity of an antenna part 6. The wireless communication circuit part 9 that has components generates high frequency is covered with a shielding case 10 as a countermeasure against usenecessary radiation. A plastic shielding case 10 that is vapor-deposited with some metal is used in recent portable cellular telephone apparatus for the purpose of weight reduction. The voice memo recording keybutton 7 is disposed in a hole part 11 that is surrounded by the shielding case 10 on the printed circuit board 8. A light emitting element 22, such as an LED, is disposed on the printed circuit board 8.

Figure 2:
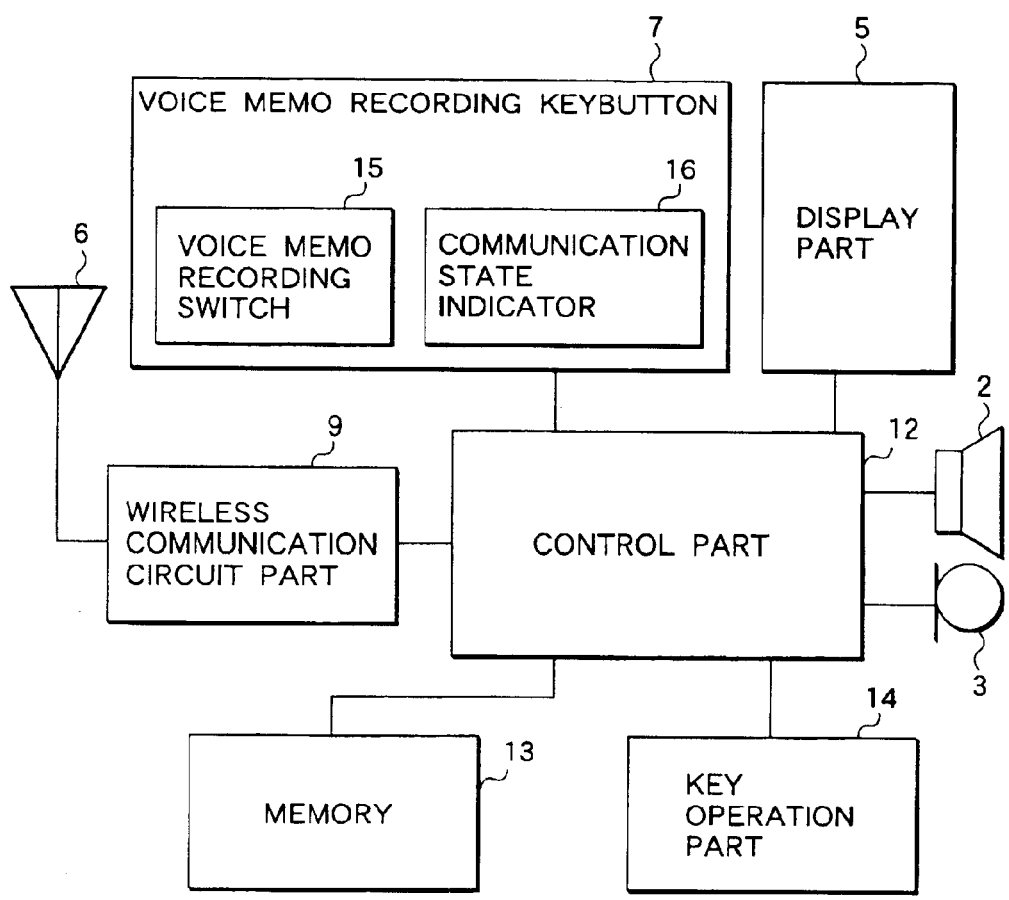
FIG. 2 is a block diagram of the portable cellular telephone apparatus that is related to the embodiment of the invention.

FIG. 2 is a block diagram of the portable cellular telephone apparatus that is related to the embodiment of the invention shown in FIG. 1. As shown in FIG. 2, the electric wave that is received at the antenna part 6 is transmitted to a signal receiving part (not shown in the figure) of the wireless communication circuit part 9, and the received information is transmitted to a control part 12. The control part 12 displays some received information, such as received telephone number, on a display part 5, such as a liquid crystal display device. The control part 12 converts the received information into vocal information and outputs the vocal sounds at the telephone receiver part 2 (a speaker). On reception of user's voice, the telephone transmitter part 3 (a microphone) transmits this to the control part 12, and then a signal transmitter part (not shown in the figure) of the wireless communication circuit part 9 and the antenna 6 transmit it wirelessly to the other party of the wireless communication.

When the voice memo recording keybutton 7 is operated, the control part 12 stores vocal information, such as the contents of the present vocal communication, in a memory 13 or reads stored information. The voice memo recording keybutton 7 operates in two functions: one is a voice memo recording switch 15 for start of recording the contents of the conversation when depressed, and the other is a communication state indicator 16 that indicates presence of communication with illumination of the light emitting element 22 as controlled by the control part 12.

The key operation part 14, such as ten keys, inputs the signal to control part 12 and stores private information, such electronic telephone directory, in the memory 13 via the control part 12 through operations of the keys.

FIG. 3 is a sectional view that shows the structure in the vicinity of the voice memo recording keybutton 7 that is the keybutton illuminating device that relates to the embodiment of the above-mentioned invention.

As shown in FIG. 3, the keybutton illuminating device is composed of the voice memo recording keybutton 7 that is supported at such parts as a skirt part 19 by a casing 18 of the main body case 1 and that comprises a contact part having the electro conductive film 17 that comes into contact with the electro conductive pattern 20 that is disposed on the printed circuit board 8 when depressed, the shielding case 1Q that supports the skirt part 19 of the voice memo recording keybutton 7, that is provided with a metal surface treatment for shielding of the components mounted on the printed circuit board 8, that has a hole part 11 that surrounds the electro conductive pattern 20, that has a rib 21 for functioning as a wall of the hole part 11, and that is supported by the printed circuit board 8, and the light emitting element 22, such as the LED, that is soldered onto the printed circuit board and that is illuminated while the communication is active.

Each of bosses 23 for positioning is so formed as to protrude at the bottom of the rib 21 of the hole part 11 of the shielding case 10 and to fit in a positioning hole 24 in the printed circuit board 8 so that a relative positioning of the light emitting element 22 and the hole part 11 of the shielding case 10 can be achieved accurately.

The wall on the light emitting element side of the shielding case 10 is provided with plating (mirror finish) 25. In addition, the shielding case 10 is suppressed by the casing 18 of the main-body-case body 1 so as to contact tightly to the printed circuit board 8 via the skirt part 19 of the keybutton for further improvement in the luminous efficiency.

Figure 3A:
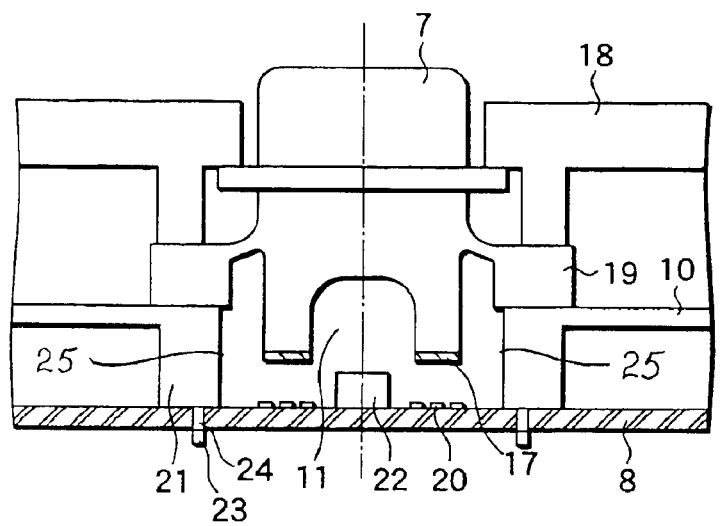
FIGS. 3A to 3C are sectional views in the vicinity of the voice memo recording key button of the embodiment of the invention.
Figure 3B:
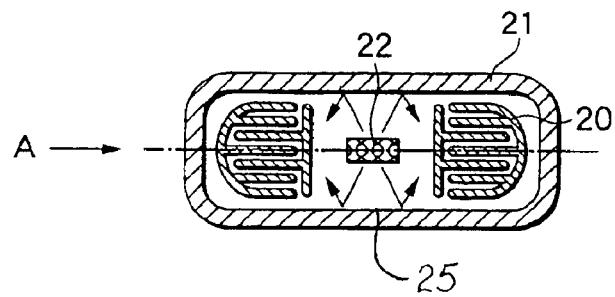

FIG. 3B shows a configuration of the illuminating part that is surrounded fully by the rib 21 except the voice memo recording keybutton 7 that is shown I FIG. 3A. FIG. 3B, wherein the rib 21 has an approximately oval shape, shows how the light beams that are emitted from the light emitting element 22, such as the LED, are reflected against the wall. The electro-conductive pattern 20 that is disposed on the printed circuit board 8 has such a configuration wherein the electro-conductive part is laid out like comb teeth for the purpose of reduction in the size and weight of the main body of the equipment, and the switch function as the keybutton is accomplished by being pushed against the contact point part that has the electro-conductive film 17 shown in FIG. 3A.

In the sectional view of FIG. 3A, when the voice memo recording keybutton 7 is pushed downward, the part in contact with the skirt part 19 is deformed and falls downward so that the electro-conductive film 17 comes into contact with the electro-conductive pattern 20 on the printed circuit board 8. Then, the LED 22 illuminates or blinks with an illuminating circuit that is not shown in the figure while the voice memo recording keybutton 7 is illuminated.

Figure 3C:
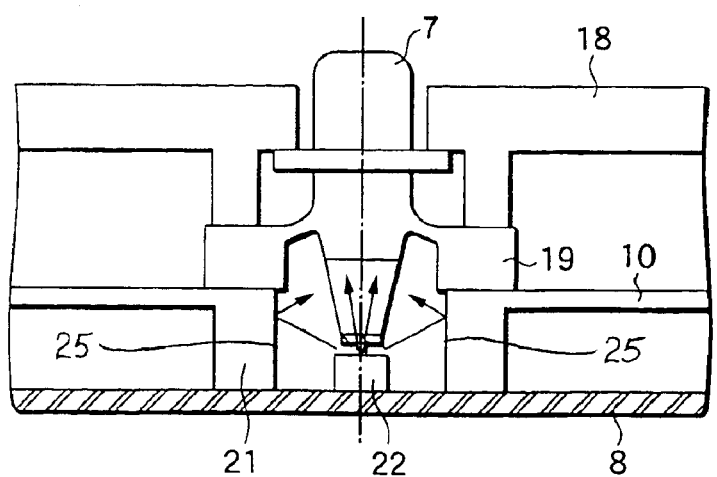

FIG. 3C is a sectional view in the direction of Arrow A in FIG. 3B, which shows a state wherein the voice memo recording keybutton 7 ascends with the force of the skirt part 19 after the voice memo recording keybutton 7 is depressed and returns to the position to contact the casing 18 of the main body case 1, and wherein the illuminated LED 22 continues to illuminates the voice memo recording keybutton 7. As described in the explanation on FIG. 2, it is also possible for the control part 12 to illuminate or blink the LED 22 during communication for the purpose of notification of the communication state with illumination of the voice memo recording keybutton 7 in a state such as in FIG. 3C.

Figure 4:
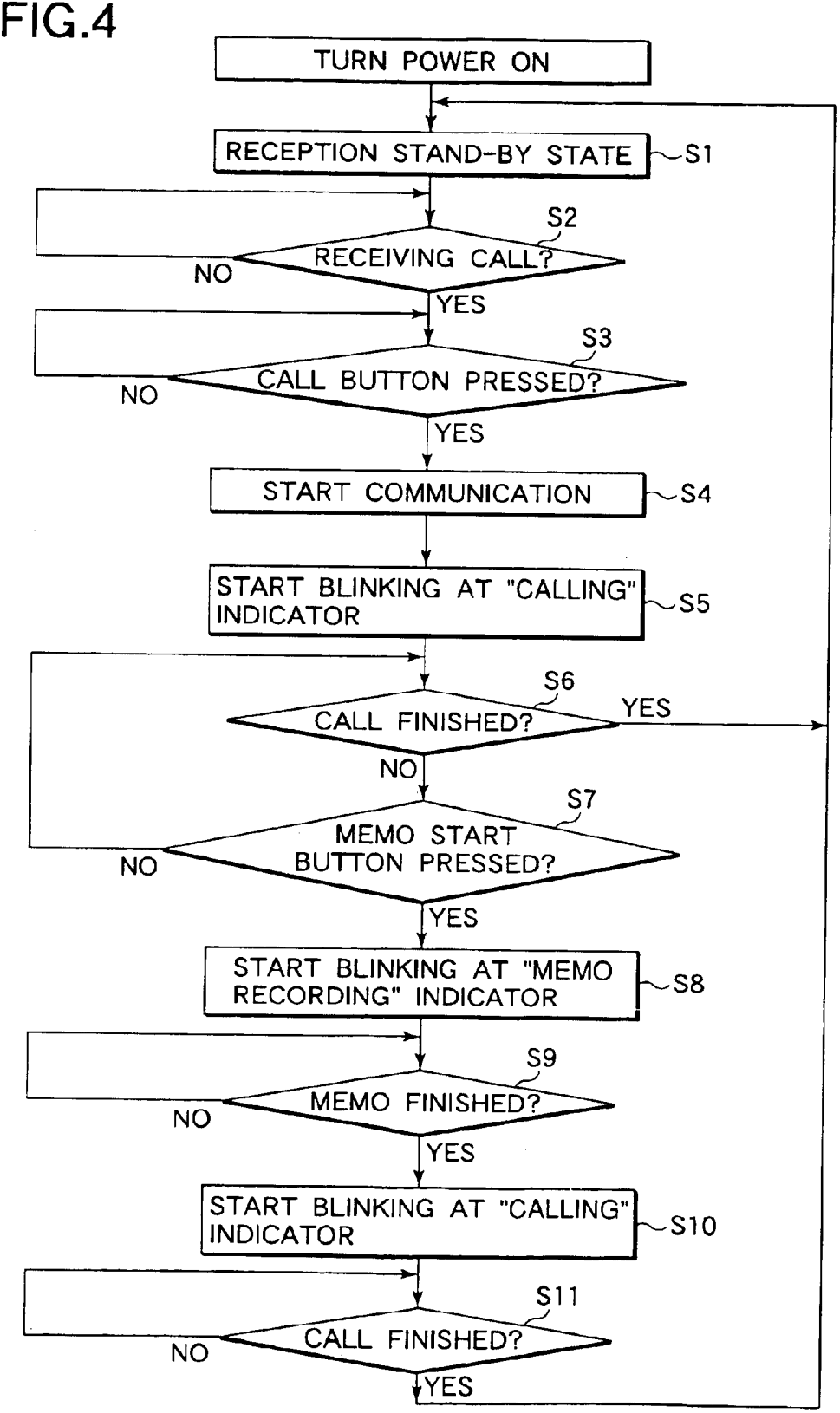
FIG. 4 is a flowchart of the portable cellular telephone that relates to the embodiment of the invention.

FIG. 4 is a flowchart that shows the operation of the communication state display while the communication is active and the operation when the voice memo is recorded on the way of the communication in the embodiment of the invention. First of all, when the power switch is turned on, the portable cellular telephone apparatus goes into a reception stand-by state (step 1) and starts ringing for notification of arrival of an in-coming call (step 2); when the user presses a communication button (step 3), the wireless communication starts (step 4). On start of the wireless communication, the control part 12 blinks the LED 22 as the communication state indicator 16 in a first illuminating color, for example, blue (step 5). Termination of the communication in this state recovers the reception stand-by state (step 6).

When the voice memo recording keybutton 7 that is the voice memo recording switch is pushed during communication (step 7), the LED 22 of the voice memo recording keybutton 7 blinks in the second illuminating color, for example, in red (step 8). On completion of the voice memo recording after expiration of a predetermined duration of time, or on completion of the voice memo recording by pressing the voice memo recording keybutton 7 again to finish the voice memo recording (step 9), the LED 22 blinks in the first illuminating color of blue as the communication state indicator 16 (step 10). Finally, the reception stand-by state resumes on completion of the communication (step 11).

The above-described operations enable to notify the people around the user of the fact that the use is in the active state of communication with blink or illumination of the voice memo recording keybutton 7 that is provided on the back surface of the main-body-case body as the communication state indicator 16 or to confirm the active state of the voice memo recording of the contents of the present vocal communication with blink or illumination when the voice memo recording keybutton 7 is depressed to function this as the voice memo recording switch 15.

As mentioned above, the configuration wherein the shielding case is provided with the hole part so as to dispose the light emitting element on the printed circuit board at such hole part and to disposed the keybutton on the light emitting element positions shielding case enables use of the inner wall of the hole part of the shielding case as reflective surface of the light from the light emitting element, since the shielding case is so accurately positioned against the printed circuit board that the relative positional relationship between the light emitting element on the printed circuit board and the shielding case is maintained accurately, and since the property of the shielding case surface that is provided with the metal-type surface treatment, making it possible to bright illumination of the keybutton through enhancement of the luminous efficiency without addition of a reflective mirror or reflective sheet for exclusive use.

Although the voice memo recording keybutton 7 is disposed in the vicinity of the antenna 6 on the back side of the main body case 1 is described for the embodiment above, a keybutton illuminating device that is similar to the embodiment of the invention can be provided on the part that is covered with the shielding case, on the front side of the main body case body 1, besides the back side of the main body case 1 in a casing wherein the shielding case is used at the ten-key part on the front side of the main body case 1.

The first aspect of the invention of the description is the keybutton illuminating device for the keybutton structure that is composed of the casing, the shielding case that is provided with metal-type surface treatment, a keybutton and the printed circuit board that is mounted with a light emitting element, in that the light emitting element is surrounded entirely by the rib that is disposed upright on the shielding case. This configuration is effective in solving of the space problem as well as improvement in the luminous efficiency.

The second aspect of the invention is the keybutton illuminating device for the keybutton structure that is composed of the casing, the shielding case that is provided with metal-type surface treatment, a keybutton and the printed circuit board that is mounted with a light emitting element, in that the light emitting element is surrounded entirely by the rib that is provided upright on the shielding case in such manner that the surface that contacts the printed circuit board contacts in the full and tight adherence. This configuration is effective in solving of the space problem as well as further improvement in the luminous efficiency.

Further, in the keybutton illuminating device, the rib that is provided upright on the shield may be constructed as to surround the light emitting element in an approximately oval shape. This configuration is effective in an improvement in the luminous efficiency.

The third aspect of the invention is the keybutton illuminating device, wherein the keybutton for switch actions of contact patterns that are print-wired on both sides of the light emitting element that is mounted on the printed circuit board is operated by pressing of the contact member that is disposed on this keybutton, in that the shielding case for holding of the skirt part of the keybutton is disposed upright on the printed circuit board in such manner as to surround the light emitting element and the contact patterns and by that wall of the shielding case reflects light beams that are emitted from the light emitting element. This configuration is effective in solving of the space problem and improvement in the luminous efficiency.

Furthre, in the keybutton illuminating device, the wall that reflects light beams from the light emitting element of the shielding case is plated for the mirror finish. This configuration is effective in an improvement in the luminous efficiency.

The fourth aspect of the invention is the wireless communication terminal apparatus that is equipped with the keybutton illuminating device for the keybutton structure that is composed of the casing, the shielding case that is provided with metal-type surface treatment, the keybutton and the printed circuit board that is mounted with the light emitting element, in that the light emitting element is surrounded entirely by the rib that is disposed upright on the shielding case. This configuration is effective in solving of the space problem and providing of the wireless communication terminal apparatus that is equipped with the keybutton illuminating device of the further improved luminous efficiency.

Further, in the wireless communication terminal apparatus the keybutton is operated when there is the need for the voice memo operation for recording of the contents of the present vocal communication, wherein the light emitting element comes to illuminate or blink on start of the voice memo operation. This configuration is effective in notification of the start of the voice memo operation with illumination or blink of the light emitting element.

Further, in the wireless communication terminal apparatus, the keybutton remains illuminating or blinking during communication. This configuration is effective in notification of the active state of communication with the illumination or blink of the light emitting element.

Furthermore, in the wireless communication terminal apparatus, the keybutton remains illuminating or blinking during communication but, on start of voice memo operation for recording of contents of the present vocal communication by depression thereof, starts illuminating or blinking in the manner different from the illuminating or blinking manner during the communication. This configuration is effective in notification of the two active states of communication and voice memo recording respectively with the single keybutton.

What is claimed is:

1. A keybutton illuminating device for a keybutton structure comprising:
   a casing;
   a shielding case that is provided with metal surface treatment;
   a keybutton; and
   a printed circuit board that is mounted with a light emitting element,
   wherein said light emitting element is surrounded entirely by a rib provided with metal surface treatment, the rib being disposed upright on said shielding case.

2. A keybutton illuminating device for a keybutton structure comprising:
   a casing;
   a shielding case that is provided with metal surface treatment;
   a keybutton and a printed circuit board that is mounted with a light emitting element,
   wherein said light emitting element is surrounded entirely by a rib that is provided upright on said shielding case in such manner that a surface that contacts said printed circuit board contacts in a full and tight adherence.

3. A keybutton illuminating device claimed in claim 1 or claim 2, wherein said rib that is provided upright on said shield is so constructed as to surround said light emitting element in an approximately oval shape.

4. A keybutton illuminating device comprising:
   a print circuit board;
   a light emitting element mounted on said print circuit board;
   a keybutton for switch actions of contact patterns that are print-wired on both sides of said light emitting element is operated by pressing of a contact member that is disposed on this keybutton; and
   a shielding case for holding of a skirt part of said keybutton is disposed upright on said printed circuit board in such manner as to surround said light emitting element and said contact patterns and by that wall of said shielding case reflects light beams that are emitted from said light emitting element.

5. A keybutton illuminating device claimed in claim 4, wherein a wall that reflects light beams from a light emitting element of said shielding case is plated for a mirror finish.

6. A wireless communication terminal apparatus that is equipped with a keybutton illuminating device comprising:
   a casing;
   a shielding case that is provided with metal surface treatment;
   a keybutton; and
   a printed circuit board that is mounted with a light emitting element,
   wherein said light emitting element is surrounded entirely by a rib portion of the shield case that is provided with the metal surface treatment, the rib being disposed upright on said shielding case.

7. A wireless communication terminal apparatus claimed in claim 6, wherein said keybutton is operated when there is a need for a voice memo operation for recording of the contents of present vocal communication, wherein said light emitting element comes to illuminate or blink on start of the voice memo operation.

8. A wireless communication terminal apparatus claimed in claim 6, wherein said keybutton remains illuminating or blinking during communication.

9. A wireless communication terminal apparatus claimed in claim 6, wherein said keybutton remains illuminating or blinking during communication but, on start of voice memo operation for recording of contents of present vocal communication by depression thereof, start illuminating or blinking in a manner different from said illuminating or blinking manner during the communication.

* * * * *